Figure 1:
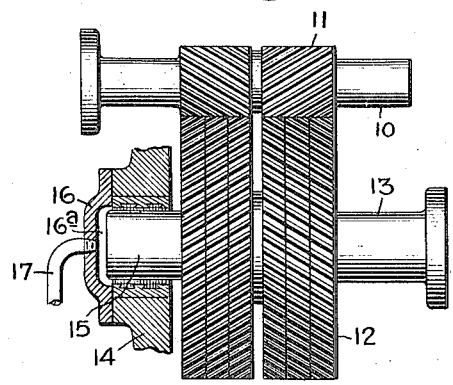

K. ALQUIST.
ELASTIC GEARING.
APPLICATION FILED MAY 5, 1915.

1,157,918.

Patented Oct. 26, 1915.
2 SHEETS—SHEET 1.

Inventor:
Karl Alquist,
by Albert G. Davis
His Attorney.

K. ALQUIST.
ELASTIC GEARING.
APPLICATION FILED MAY 5, 1915.

1,157,918.

Patented Oct. 26, 1915.
2 SHEETS—SHEET 2.

Inventor:
Karl Alquist,
by Albert G. Davis
His Attorney.

UNITED STATES PATENT OFFICE.

KARL ALQUIST, OF SCHENECTADY, NEW YORK.

ELASTIC GEARING.

1,157,918.　　　　　Specification of Letters Patent.　　　Patented Oct. 26, 1915.

Application filed May 5, 1915. Serial No. 26,148.

*To all whom it may concern:*

Be it known that I, KARL ALQUIST, a subject of the King of Sweden, residing at Schenectady, county of Schenectady, State of New York, have invented certain new and useful Improvements in Elastic Gearing, of which the following is a specification.

The present invention relates to elastic or flexible gearing; that is, gearing in which one or more of the gear elements is capable of axial deflection to compensate for inequalities in tooth pressure.

It relates particularly to such gearing wherein the elastic element or elements comprises or comprise a plurality of elastic or flexible plates or laminations rigidly mounted on a shaft or support, there being a small clearance space between the plates near the periphery.

The face of the gear is provided with helically cut teeth which are free to yield laterally by a slight amount under the pressure of the teeth of the coöperating gear. This yielding of the gear teeth is due to the fact that the metal plates are elastic and also to the fact that each plate at its periphery is separated from the other by a small space. I have found that in running gears of this type there appears to be under certain conditions excessive pressures between the driving and the driven teeth which cannot be accounted for by the load carried or by the ordinary errors in adjustment or in the shape of the teeth. I have also observed that there is sometimes set up a relative axial swinging motion between the two gear wheels running in mesh, which seems to be different from the small axial motion generally present in gears, the periodicity of which follows the revolutions of the gears. The periodicity of this swinging motion on the other hand appears to be independent of the speed of the gear wheels and is evidently a function of the respective rotating masses and the spring capacity of the flexible disks, though, the two motions referred to being simultaneous, its detection is made somewhat difficult. It is a well known fact that spring supported masses moved at high speeds generally have a tendency to vibrate and to increase the amplitude of vibration until it is limited by some resistance to the movement. A flexible gear may be considered as a similar case, and, if so, there is very little resistance present to limit the movement, and in addition to increased wear there will be danger of the disks being subjected to very severe bending stresses which would cause the material in time to crystallize and break.

I have discovered that by introducing a small resistance to axial motion of the gear wheels severe wear of the teeth will be stopped; *i. e.*, a certain load on the gears without such resistance will wear the teeth rapidly while the same load after the resistance is introduced will cause no noticeable wear. This resistance may be applied in various ways. A convenient method and one which I now prefer comprises the use of a dash pot device which, on well known principles, offers yielding resistance to axial motion of the shafts and thus damps or prevents any such motions. This dash pot device may, for example, use oil from the lubricating system.

Figure 2:
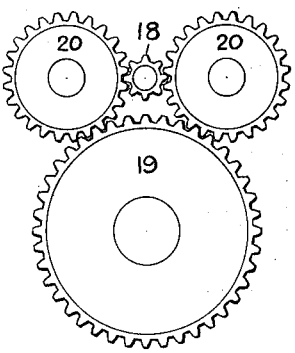
Figure 4:
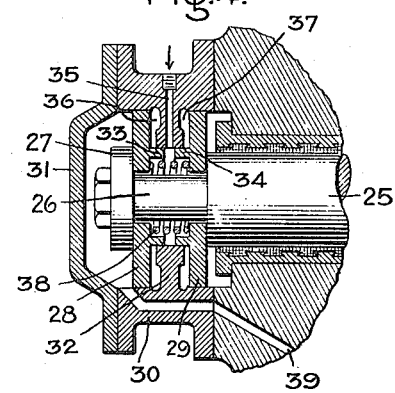
Figure 5:
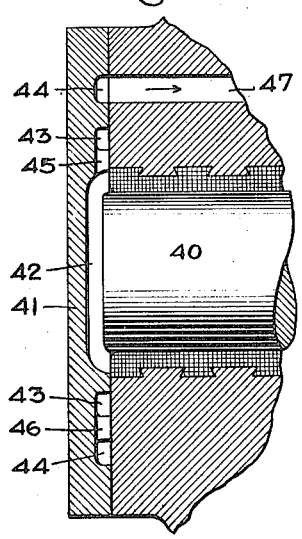
Figure 6:
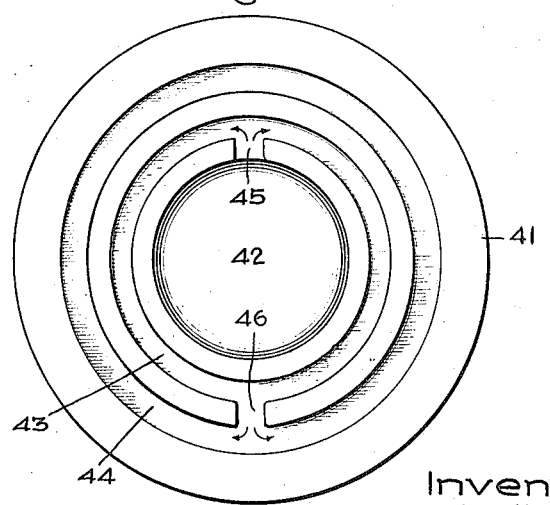
Figure 7:
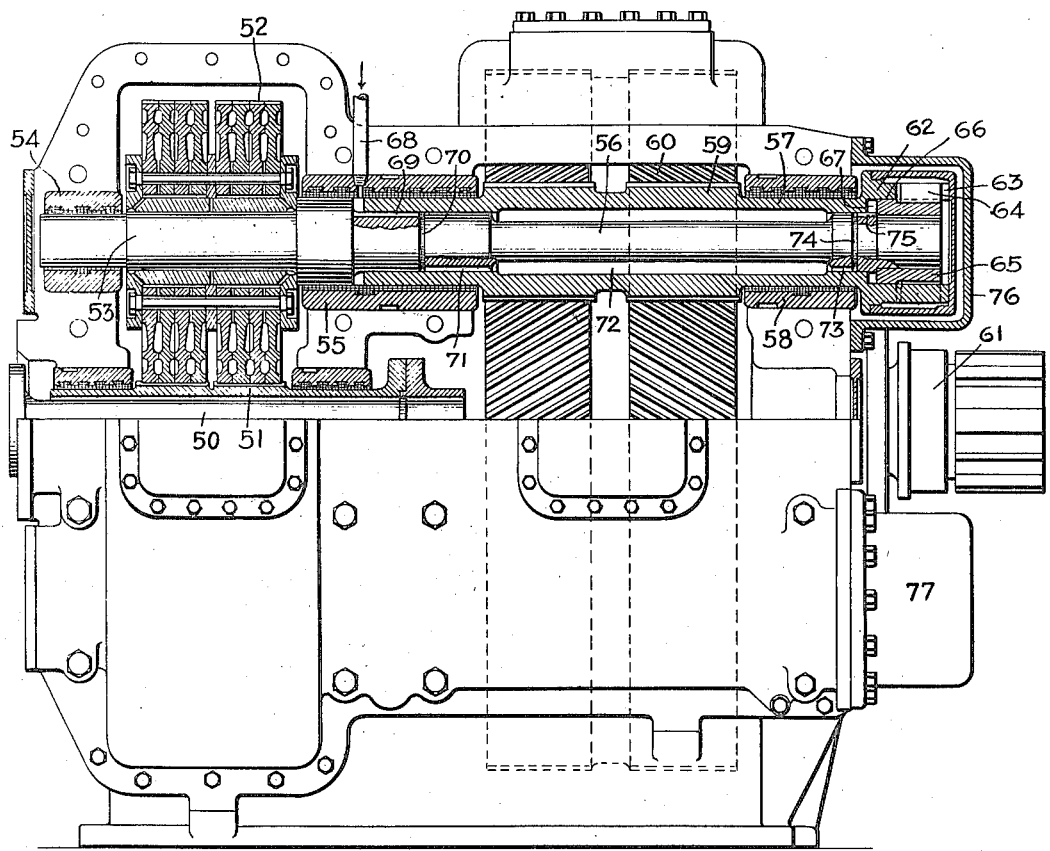
Figure 8:
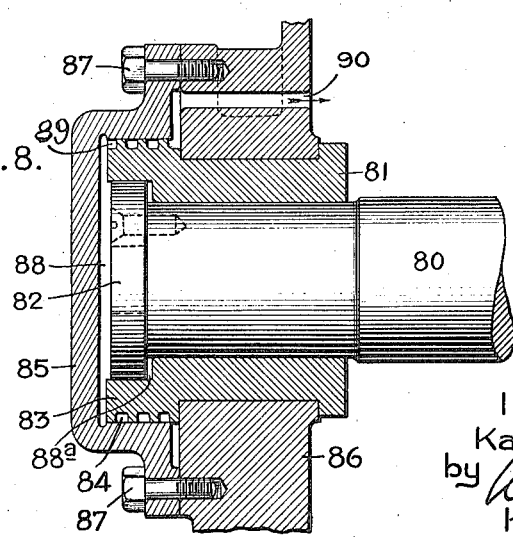

In the accompanying drawing Figure 1 is a plan view of a single reduction gearing embodying my invention. Fig. 2 is an end view, and Fig. 3 a plan of a second form of gearing embodying my invention; Fig. 4 illustrates a third form which my invention may take; Figs. 5 and 6 illustrate another form of my invention, Fig. 5 being a sectional view and Fig. 6 a face view of one of the parts shown in Fig. 5; Fig. 7 illustrates an embodiment of my invention in connection with double reduction gearing, one side of the upper half of the gear casing being removed; and Fig. 8 shows still another form which my invention may take.

Referring first to Fig. 1, 10 indicates a shaft carrying the solid helical pinion 11 which meshes with the elastic or flexible wheel 12 mounted on the shaft 13. 14 indicates a bearing for the free end 15 of the shaft 13. The free end of the shaft is provided with a cap 16 making an inclosed space 16$^a$ into which oil is fed by maens of the pipe 17. The area of this pipe is restricted and offers frictional resistance to the passage of oil or other fluid therethrough, it being understood that this pipe 17 is connected with a lubricating system or other source of pressure. If now the wheel 12 and its shaft 13 move axially the free end of the shaft 15 will act as a plunger and the motion will be retarded by its pumping action on the oil. In this figure the dash-pot is shown as applied to the end of the shaft carrying the flexible element, but it is to be understood that my invention is not limited to this arrangement, as the dash-pot device may be applied to the other shaft member, or even to both of them, as will appear more clearly hereinafter.

Figure 3:
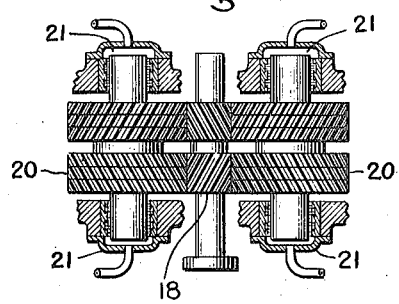

Referring now to Figs. 2 and 3, 18 indicates a helical pinion driving the gear 19 through the two elastic gears 20. The driven gear 19 is omitted from Fig. 3 in order to make the view clearer. Associated with each of the free ends of the shafts carrying the elastic gears 20 are dash pot devices 21, of the same structure as shown in connection with Fig. 1. The action of these dash pot devices is the same as that described in connection with Fig. 1. Such a dash pot is especially suitable for this type of gear as the pressures on the ends of the shafts balance each other.

In Fig. 4 is shown a special type of dash pot which, although applied to one end of the shaft, provides a more nearly balanced pressure than would result from the arrangement shown in Fig. 1. The structure amounts in substance to a double acting dash pot. The end of the shaft 25 which may be a shaft carrying a flexible gear or another shaft has an extension 26 of reduced diameter carrying a collar 27. Between this collar and the shaft are arranged the pistons 28 and 29 which slide in the cylinder 30 which surrounds the extension 26 and is closed on the end by a cap 31. The cylinder 30 has a central inwardly projecting annular member 32 in which slides the annular projections 33 and 34 carried by the pistons 28 and 29 respectively. Oil or other fluid under suitable pressure is fed through passage 35 and leaks through between the various surfaces so as to fill the clearance spaces 36 and 37 between the member 32 and the pistons 28 and 29 and hold them in position against the collar 27 and the shoulder on shaft 25 respectively. It also acts to lubricate the parts. If found desirable a spring 38 may also be provided between the pistons 28 and 29 in order to insure that they follow the movements of the shaft. The oil or other fluid which leaks out past the piston 28 drains off by way of passage 39. It will be understood that the pressure of the oil or other fluid in the clearance spaces 36 and 37 on the pistons 28 and 29 normally balance each other. In case of axial movement, however, in either direction the oil will offer the required resistance to prevent or dampen such movements or vibrations.

In Figs. 5 and 6 I have illustrated another form of my invention which is somewhat simpler than the form shown in Fig. 4, but which, however, is practically balanced and double acting. 40 indicates a shaft of an elastic gearing set over the end of which is placed a cap 41 which is cored out to provide a clearance space 42 between them. As best shown in Fig. 6, this cap is also provided with a plurality of concentric annular grooves which communicate with each other. In the present instance, two grooves 43 and 44 are shown. The inner groove 43 communicates with the clearance space 42 through the passage 45, and it communicates with the groove 44 through the passage 46 which is diametrically opposite the passage 45. The groove 44 at a point diametrically opposite the passage 46 communicates with a discharge passage 47 which may communicate with a suitable drain pipe. Oil from the bearing in which the shaft 40 runs leaks out and fills the clearance space 42 from which the oil may pass to the discharge passage 47 by way of the grooves 43 and 44. These grooves, as will be seen, offer a passage of considerable length between the clearance space 42 and the passage 47, although ordinarily the oil may pass freely through them. The pressure in the clearance space and on the end of the shaft will be small as the pressure head of the oil in the grooves is small. In case of axial movement on the part of the shaft 40, however, a pumping action will take place which, in view of the considerable length of the grooves, will offer resistance both as to the reversal of direction in flow, as well as to the frictional resistance of the grooves, which will act to dampen or prevent axial movements or vibrations of the shaft and connected gears. It will be understood that the dash pot device may be acting either on the shaft of the flexible gear or on the shaft of the pinion in mesh therewith and such devices may also be applied to both members.

In Fig. 7, I have shown my invention in connection with a gearing of the double reduction type and in which the dash pot effect is obtained in connection with one or more of the couplings. In this figure 50 indicates a high speed shaft driving the pinion 51 which in turn meshes with two flexible gears. Only one of these flexible gears 52 is shown in the drawing. It will be understood that the other is below the pinion and within the lower portion of the casing. The arrangement in the lower portion of the casing is a duplicate of that illustrated in the upper portion of the casing so that a description and illustration of one is sufficient. The elastic gear 52 is carried by the shaft 53 which is supported in bearings 54 and 55 and has an extension 56 which passes through a hollow shaft 57 supported in the bearing 55 and bearing 58. The shaft 57 carries the gear 59 which meshes with the driven gear 60 which is carried by the shaft 61. The shaft extension 56 and the hollow shaft 57 are coupled together in the following manner: The hollow shaft 57 has an enlarged portion 62 which is counterbored and is provided with slots 63 into which extend the several projections or fingers 64 carried by the member 65 keyed to the end of the extension 56. The slots 63 are of greater depth in an axial direction than the axial length of the projections 64 so as to permit of slight axial motion of the shaft extension 56 relative to the hollow shaft 57. The shaft extension 56 has a close sliding fit at its ends with the bore of the hollow shaft 57 and the member 65 has a close sliding fit with the bore of the enlarged portion 62 as indicated at 66, thus forming with it an annular clearance space 67. Oil is fed to the bearings and to this clearance space by way of pipe 68, passages 69, 70 and 71, clearance space 72, between the shafts 56 and 57, and the passages 73, 74 and 75. It will be understood that the passages 70 and 71 are grooves extending partly or wholly around the shaft 56. It will thus be seen that the member 65 forms in substance a piston which slides in a cylinder which is formed by the portion 62 and that the clearance space 67 is normally filled with oil under a certain desired pressure. It will also be noted that the passage from the supply pipe 68 to the clearance space 67 is a long tortuous one so as to offer considerable frictional resistance to flow in either direction. These parts, therefore, act after the manner of a dash pot to prevent or dampen any vibratory axial motions of the shaft 56 which carries the flexible gear 52. 76 is a cap or casing which fits over the end of the coupling. A corresponding cap for the coupling in the lower portion of the casing is indicated at 77.

Referring now to Fig. 8 wherein I have shown still another form of my invention, 80 indicates the end of a gear shaft supported in the bearing 81 and having a collar or plate 82 on its free end which is somewhat larger in diameter than the shaft. This collar or plate makes a sliding fit with a projecting portion 83 of the bearing 81 and cut in the outer surface of the projecting portion 83 is a screw-threaded groove 84. Inclosing the end of the shaft and surrounding the portion 83 so as to close the open sides of the groove 84 is a cap 85 suitably attached to a supporting member 86 by means of bolts 87. Between the cap and collar 82 is a clearance space 88, and between the collar and the bearing 81 is an annular space 88ª. One end of the groove 84 communicates with the clearance space 88 at 89, while the other end communicates with the passage 90. The arrangement shown in this figure operates after the manner of that shown in Figs. 5 and 6. It has, however, certain structural advantages in that it is cheaper and easier to build. The oil leaking through the bearing fills the annular space 88ª, the clearance space 88 and the groove 84 passing out through the passage 90. Ordinarily this oil offers very little pressure on the end of the shaft, the pressures in the two spaces 88 and 88ª tending to a great extent to balance each other. In case of axial movement of the shaft, however, a pumping action, as already explained in connection with other of the embodiments of my invention, takes place so as to prevent or dampen these movements or vibrations.

In accordance with the provisions of the patent statutes, I have described the principle of operation of my invention together with the apparatus which I now consider to represent the best embodiment thereof; But I desire to have it understood that the apparatus shown is only illustrative, and that the invention can be carried out by other means such as are within the scope of the appended claims.

What I claim as new and desire to secure by Letters Patent of the United States, is:—

1. The combination with elastic helical spur gearing, of means associated therewith for preventing or damping relative axial motion between the gear wheels in mesh.

2. The combination with elastic helical spur gearing, of a dash pot device associated therewith for preventing or damping relative axial motion between the gear wheels in mesh.

3. The combination with elastic helical gearing, comprising a driving element, a driven element, and intermediate elastic gear elements through which power is transmitted from the driving to the driven element, of dash pot devices of which the free ends of the shafts which carry the elastic gear elements form a part for preventing or damping axial vibrations among the respective gear elements.

4. The combination with elastic helical gearing, comprising a driving element, a driven element, and an intermediate elastic gear element through which power is transmitted from the driving to the driven element, of means associated with the shaft carrying the elastic element for preventing or damping axial vibratory motion.

5. The combination with helical gearing comprising an elastic gear, of a dash pot device associated with an end of the shaft of one of the gears, and of which such end forms a part for preventing or damping axial vibratory motion.

6. The combination with helical gearing comprising an elastic gear, of a dash pot device associated with an end of the shaft of the elastic gear, and of which such end forms a part for preventing or damping axial vibratory motion.

7. The combination with helical gearing comprising an elastic gear formed of a plurality of plates clamped together at their central portion and slightly spaced apart at their periphery to permit of axial yielding, of a cap which fits over an end of one of the gear shafts and forms an inclosed space, and means for supplying fluid under pressure to such space.

8. The combination with helical gearing comprising a shaft which carries an elastic gear formed of a plurality of plates clamped together at their central portion and slightly spaced apart at their periphery to permit of axial yielding, of a cap which fits over the end of said shaft and forms an inclosed space, and means for supplying fluid under pressure to such space.

9. In helical gearing, the combination of a driving gear, a driven gear, one of said gears being elastic so as to yield axially under tooth pressure, shafts for said gears, a cap which fits over a free end of one of the shafts which carry the gears and forms therewith an inclosed space, and a pipe for supplying fluid under pressure to such space.

10. The combination with elastic helical gearing comprising a driving gear, a driven gear, and two intermediate elastic gears through which power is transmitted from the driving to the driven gear, of caps fitted over the free ends of the shafts which carry the elastic gears and form inclosed spaces, and means for supplying fluid under pressure to such spaces.

11. The combination with helical gearing comprising a shaft carrying an elastic gear, of a cap which fits over a free end of one of the shafts and forms an inclosed space, and means forming a passage of substantial length which communicates with said space and through which fluid may move toward or away from it.

12. In double reduction helical gearing, the combination of a driving gear, a driven gear, and two intermediate gears, at least one of which is elastic, mounted on separate shafts and through which power is transmitted from the driving to the driven gear, of a coupling for said shafts, and means associated with said coupling forming a dash pot device for preventing or damping axial vibratory motion.

13. In double reduction helical gearing, the combination of a driving gear, a driven gear, and two intermediate gears, at least one of which is elastic, mounted on separate shafts and through which power is transmitted from the driving gear to the driven gear, of a sliding coupling for said shafts which permits of slight relative axial motion of the shafts, and means associated with said coupling forming a dash pot for damping or preventing axial vibratory motion.

In witness whereof, I have hereunto set my hand this 4th day of May 1915.

KARL ALQUIST.